United States Patent
Kim et al.

(10) Patent No.: US 10,513,200 B2
(45) Date of Patent: Dec. 24, 2019

(54) VEHICLE BATTERY SYSTEM AND METHOD OF CONTROLLING CHARGE OF BATTERY IN THE SYSTEM

(71) Applicants: Hyundai Motor Company, Seoul (KR); Kia Motors Corporation, Seoul (KR)

(72) Inventors: Mi Ok Kim, Gyeonggi-Do (KR); Beom Gyu Kim, Gyeonggi-Do (KR); Jong Hu Yoon, Gyeonggi-Do (KR); Tae Hwan Chung, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 183 days.

(21) Appl. No.: 15/693,968

(22) Filed: Sep. 1, 2017

(65) Prior Publication Data

US 2018/0281616 A1   Oct. 4, 2018

(30) Foreign Application Priority Data

Apr. 4, 2017   (KR) ........................ 10-2017-0043881

(51) Int. Cl.
  *B60L 58/22*   (2019.01)
  *B60L 58/20*   (2019.01)
  (Continued)

(52) U.S. Cl.
  CPC ................. *B60L 58/12* (2019.02); *B60L 1/00* (2013.01); *B60L 58/20* (2019.02); *B60L 58/22* (2019.02);
  (Continued)

(58) Field of Classification Search
  CPC .......... B60L 53/12; B60L 53/16; B60L 53/14; B60L 58/12; B60L 58/20; B60W 10/24;
  (Continued)

(56) References Cited

U.S. PATENT DOCUMENTS 8,872,482 B2 * 10/2014 Jung ..................... B60L 3/0046
                                                         320/138
9,912,177 B2 *  3/2018 Von Novak ............ B60L 58/22
(Continued)

FOREIGN PATENT DOCUMENTS

JP          5821619 B2    11/2015
KR         20130013108     2/2013
WO       2016151077 A1     9/2016

*Primary Examiner* — Fritz M Fleming
*Assistant Examiner* — Jagdeep S Dhillon
(74) *Attorney, Agent, or Firm* — Mintz Levin Cohn Ferris Glovsky and Popeo, P.C.; Peter F. Corless (57) ABSTRACT

A vehicle battery system and a method of controlling charge of a battery in the system are provided. The system includes a first battery module that has a plurality of battery cells connected to each other in series and a second battery module that has a plurality of battery cells connected to each other in series. The second battery module is connected to the first battery module in series. A controller then monitors a state of charge of each of the first and second battery modules, such that when the state of charge of one of the first and second battery modules is less than a predetermined level, the controller performs active cell balancing between the battery cells of the first battery module and the battery cells of the second battery module.

9 Claims, 5 Drawing Sheets

(51) Int. Cl.
   *B60L 58/12* (2019.01)
   *B60L 1/00* (2006.01)
(52) U.S. Cl.
   CPC ........ *B60L 2210/12* (2013.01); *Y02T 10/7005* (2013.01)
(58) Field of Classification Search
   CPC ...... B60W 10/26; B60W 10/28; B60W 20/00; G01N 27/416
   USPC ................ 307/9.1, 10.1, 10.2, 10.6, 64, 66; 320/138, 134, 128, 118; 324/434
   See application file for complete search history.

(56) References Cited

U.S. PATENT DOCUMENTS

| | | | | |
|---|---|---|---|---|
| 2010/0001737 A1* | 1/2010 | Kubo | ................... | H02J 7/0013 324/434 |
| 2011/0309795 A1* | 12/2011 | Firehammer | ......... | H02J 7/0014 320/118 |
| 2011/0309799 A1* | 12/2011 | Firehammer | ......... | H02J 7/0016 320/134 |
| 2013/0293006 A1* | 11/2013 | Kang | ....................... | H02J 1/10 307/10.1 |
| 2014/0183939 A1* | 7/2014 | Jiang | ..................... | B60L 58/18 307/9.1 |
| 2014/0197682 A1* | 7/2014 | Tabatowski-Bush | ....................... | H02J 7/0016 307/9.1 |
| 2015/0191162 A1* | 7/2015 | Dao | ........................ | H04Q 9/00 701/22 |
| 2015/0231982 A1* | 8/2015 | Li | ........................... | B60L 1/003 701/22 |
| 2015/0232083 A1* | 8/2015 | Yu | ........................ | B60W 10/06 701/22 |
| 2015/0329003 A1* | 11/2015 | Li | ........................... | B60L 58/13 320/134 |
| 2018/0241239 A1* | 8/2018 | Frost | ........................ | H02J 7/00 |

* cited by examiner

VEHICLE BATTERY SYSTEM AND METHOD OF CONTROLLING CHARGE OF BATTERY IN THE SYSTEM

CROSS REFERENCE TO RELATED APPLICATION

The present application claims priority to Korean Patent Application No. 10-2017-0043881, filed Apr. 4, 2017, the entire contents of which is incorporated herein for all purposes by this reference.

BACKGROUND

Field of the Invention

The present invention relates generally to a vehicle battery system and a method of controlling charge of a battery in the system, and more particularly, to a vehicle battery system and a method of controlling charge of a battery in the system, wherein available capacity of a battery is increased efficiently without requiring installation of an additional battery, thereby achieving extended battery life.

Description of the Related Art

In general, an eco-friendly vehicle such as a hybrid vehicle, an electric vehicle, and a fuel cell vehicle generates driving force by a motor using electric energy instead of an engine that burns fossil fuel. The eco-friendly vehicle has a rechargeable battery for storing electric energy used to drive the motor. In other words, the eco-friendly vehicle has a system in which electric energy stored in a battery mounted in a vehicle is supplied to a drive motor for driving the vehicle, and the battery is charged using regenerative braking or the like when the vehicle is being driven.

Since the mileage of the eco-friendly vehicle depends on the capacity of the battery, an expensive high capacity battery is required to increase the mileage of the vehicle. Thus, when the eco-friendly vehicle uses the expensive high capacity battery for increasing the mileage, the product cost of the eco-friendly vehicle increases, and the volume and weight of high capacity battery are reflected in the specification of the product, thereby reducing the desirability of the final product.

The foregoing is intended merely to aid in the understanding of the background of the present invention, and is not intended to mean that the present invention falls within the purview of the related art that is already known to those skilled in the art.

SUMMARY

Accordingly, the present invention provides a vehicle battery system and a method of controlling charge of a battery in the system, wherein available capacity of a battery is increased efficiently without requiring installation of an additional battery, thereby achieving extended battery life.

According to one aspect of the present invention, a vehicle battery system may include: a first battery module having a plurality of battery cells connected to each other in series; a second battery module having a plurality of battery cells connected to each other in series, the second battery module being connected to the first battery module in series; and a controller configured to monitor a state of charge of each of the first and second battery modules, and when the state of charge of one of the first and second battery modules is less than a predetermined level, configured to perform active cell balancing between the battery cells of the first battery module and the battery cells of the second battery module.

In the exemplary embodiment of the present invention, a voltage obtained by summing an output voltage of the first battery module and an output voltage of the second battery module may correspond to a power supply voltage for a high-voltage load of a vehicle. In addition, the controller may be configured to perform the active cell balancing such that the first battery module is charged with energy stored in the second battery module when the vehicle is in a driving state, a charge amount of the first battery module is less than a first reference value, and a charge amount of the second battery module is greater than a second reference value. The controller may also be configured to perform the active cell balancing such that the first battery module is charged with external power when the vehicle is in a driving state, the charge amount of the first battery module is less than the first reference value, and the charge amount of the second battery module is equal to or less than the second reference value.

Further, an output voltage of the second battery module may correspond to a power supply voltage for a low-voltage load of the vehicle. The controller may be configured to perform the active cell balancing such that the second battery module is charged with energy stored in the first battery module when the vehicle is in a non-driving state, a charge amount of the second battery module is less than a third reference value, and a charge amount of the first battery module is greater than a fourth reference value. The exemplary embodiment of the present invention may further include a second switch connected between the second battery module and the low-voltage load, wherein the controller may be configured to turn off the second switch when a charge amount of the second battery module is less than a third reference value and a charge amount of the first battery module is equal to or less than a fourth reference value.

According to another aspect of the present invention, a method of controlling charge of a vehicle battery is provided and is used in a vehicle battery system including first and second battery modules connected to each other in series, and a controller configured to monitor a state of charge of each of the first and second battery modules. The method may include: performing active cell balancing between battery cells of the first battery module and battery cells of the second battery module by the controller when the state of charge of one of the first and second battery modules is less than a predetermined level.

In the exemplary embodiment of the present invention, the performing of active cell balancing may further include: detecting an operation state of a vehicle by the controller; comparing a charge amount of the first battery module with a first reference value by the controller when the vehicle is in a driving state; comparing a charge amount of the second battery module with a second reference value by the controller when the charge amount of the first battery module is less than the first reference value; and charging the first battery module with energy stored in the second battery module by performing the active cell balancing by the controller when the charge amount of the second battery module is greater than the second reference value. The exemplary embodiment of the present invention may further include: charging the first battery module by the controller using external power when the charge amount of the second battery module is equal to or less than the second reference value.

In addition, the performing of active cell balancing may further include: detecting an operation state of a vehicle by the controller; comparing a charge amount of the second battery module with a third reference value by the controller when the vehicle is in a non-driving state; comparing a charge amount of the first battery module with a fourth reference value by the controller when the charge amount of the second battery module is less than the third reference value; and charging the second battery module with energy stored in the first battery module by performing active cell balancing by the controller when the charge amount of the first battery module is greater than the fourth reference value.

The system may further include a second switch connected between the second battery module and a low-voltage load, and the method may further include: comparing a voltage of the second battery module with a fifth reference value when the charge amount of the first battery module is equal to or less than the fourth reference value, and turning off the second switch when the voltage of the second battery module is less than the fifth reference value.

According to the vehicle battery system and the method of controlling charge of a battery in the system, it may be possible to increase the available capacity of the battery more efficiently without requiring installation of the additional battery, thereby achieving extended battery life. Further, it may be possible to reduce the cost and to efficiently improve the specification of the vehicle without additionally installing a high-priced, a high-volume, and a heavy-weight battery.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of a vehicle battery system and a method of controlling charge of a battery in the system according to the present invention will be described in detail with reference to the accompanying drawings. Throughout the drawings, the same reference numerals will refer to the same or like parts.

Figure 1:
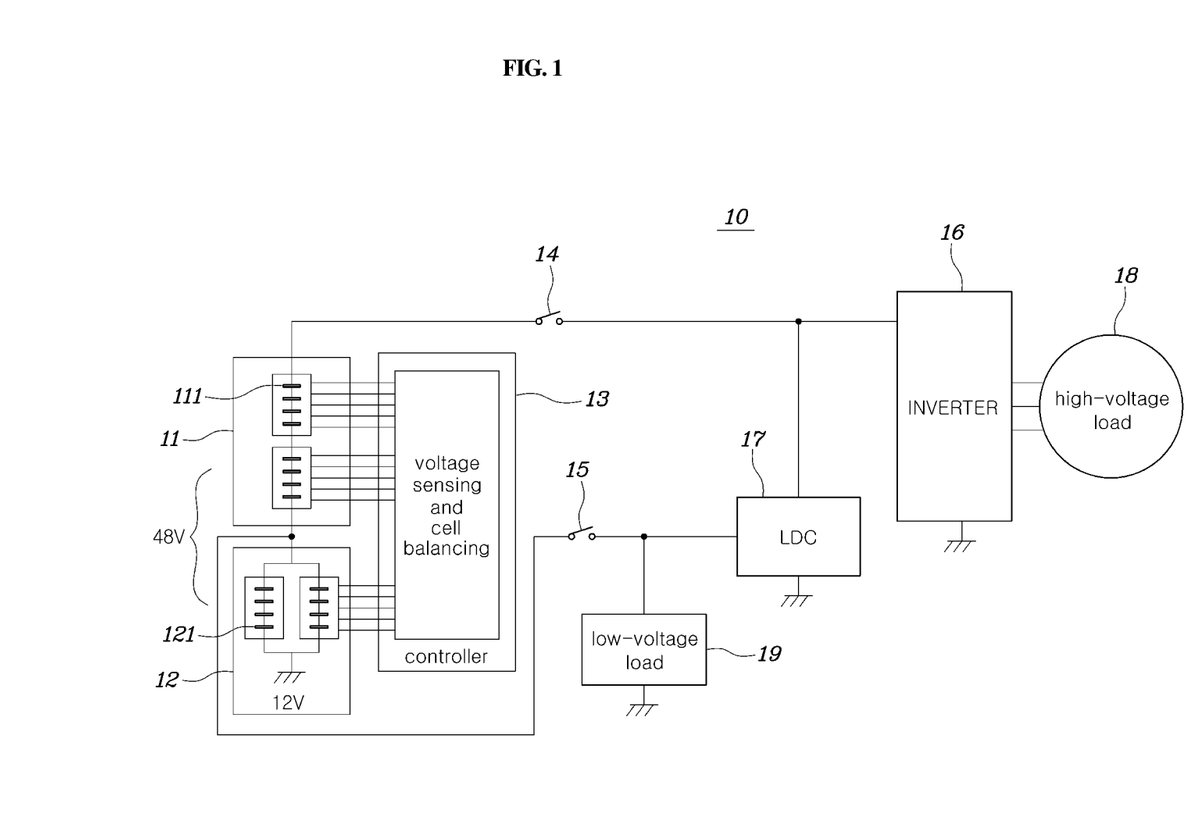
FIG. 1 is a circuit diagram showing a vehicle battery system according to an exemplary embodiment of the present invention.

FIG. 1 is a circuit diagram showing a vehicle battery system according to an exemplary embodiment of the present invention. Referring to FIG. 1, a vehicle battery system 10 according to an exemplary embodiment of the present invention may include a first battery module 11, a second battery module 12, a controller 13, a first switch 14, a second switch 15, an inverter 16, a low direct current-direct current (LDC) 17, a high-voltage load 18, and a low-voltage load 19. The controller 13 includes a memory and a processor and may be configured to operate the other components of the battery system.

Particularly, the first battery module 11 may include a plurality of battery cells 111 connected to each other in series. For example, as shown in FIG. 1, the first battery module 11 may be implemented in a structure in which eight battery cells having a capacity of 6.5 Ah are connected to each other in series. The second battery module 12 may include a plurality of battery cells 121 connected to each other in series and is connected in series to the first battery module 11. For example, the second battery module 12 may include eight battery cells having a capacity of 30 Ah. The eight battery cells of the second battery module 12 may be divided into two groups each including four battery cells, in which the four battery cells of each group may be connected to each other in series, and the series-connected battery groups may be connected to each other in parallel.

As shown in FIG. 1, a voltage obtained by summing an output voltage of the first battery module 11 and an output voltage of the second battery module 12 may correspond to a power supply voltage for the high-voltage load 18 of the vehicle (e.g., 48 V in the example of FIG. 1). In addition, the output voltage of the second battery module 12 may correspond to a power supply voltage for the low-voltage load 19 of the vehicle (e.g., 12 V in the example of FIG. 1). For example, the voltage obtained by summing the output voltages of the first and second battery modules 11 and 12 may be converted into an alternating current by the inverter 16 to be used as a power supply voltage for a motor providing the driving force of the vehicle.

The first switch 14 may be connected between the first battery module 11 and the high-voltage load 18, and the second switch 15 may be connected between the second battery module 12 and the low-voltage load 19. For example, the first and second switches 14 and 15 may be implemented as various switching elements known in the art, such as relays and the like. Additionally, ON/OFF states of the first and second switches 14 and 15 may be adjusted by the controller 13. For example, when the motor is driven for driving the vehicle, the controller 13 may be configured to turn on the first switch 14 to supply the summed voltage of the first and second battery modules 11 and 12 to the motor. Further, the controller 13 may be configured to turn on the second switch 15 to supply electric power to the low-voltage load 19 required for driving the vehicle. In addition, the controller 13 may be configured to monitor the state (e.g., charge amount, temperature, etc.) of the second battery module 12, and perform an operation of protecting the second battery module 12 by turning off the second switch 15 as required.

Moreover, the controller 13 may be configured to monitor a state of charge (SOC) of each of the first and second battery modules 11 and 12. When the state of charge of one of the first and second battery modules 11 and 12 is less than a predetermined level, the controller 13 may be configured to perform active cell balancing between the battery cells 111 of the first battery module 11 and the battery cells 121 of the second battery module 12. The controller 13 may be implemented as a control system such as a battery management system (BMS). In particular, active cell balancing refers to a method of balancing the SOC of the first and second battery modules 11 and 12 connected to each other in series as shown in FIG. 1 by moving energy of a battery cell having a high SOC to a battery cell having a low SOC.

Figure 2:
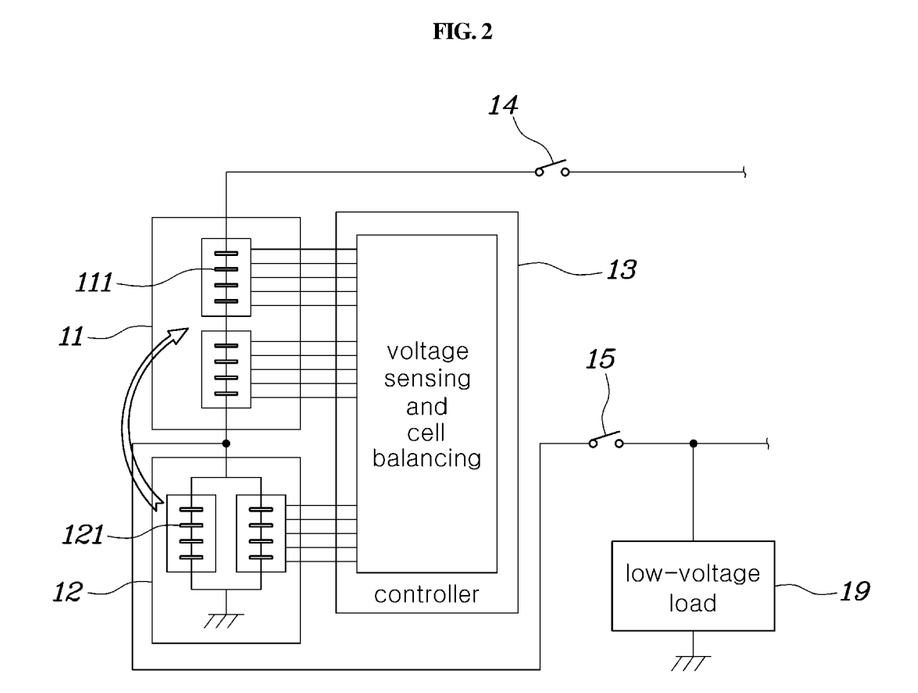
FIGS. 2 and 3 are views showing active cell balancing according to the exemplary embodiment of the present invention.
Figure 3:
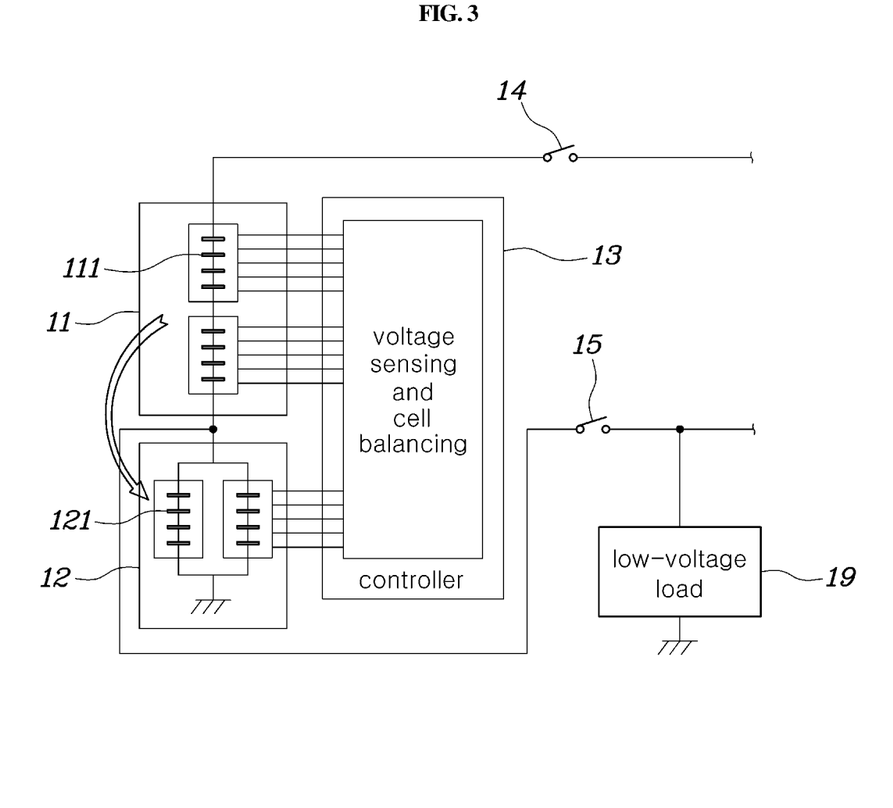

+ An active cell balancing process will be described in detail in FIGS. 2 to 5. FIGS. 2 and 3 are views showing active cell balancing according to the exemplary embodiment of the present invention. Particularly, FIG. 2 shows a case where the vehicle is in a driving state, and FIG. 3 shows a case where the vehicle is in ACC/IG/ST states.

First, referring to FIG. 2, for example, when the vehicle is in a driving state, the first switch 14 may be turned on to supply electric power to the high-voltage load 18, which is the motor, required for driving the vehicle, and electric power may be supplied to the LDC 17 such that electric power is supplied to the low-voltage load 19. Since the vehicle regularly supplies desired electric power to the high-voltage load 18 and the LDC 17, the first battery module 11 may be discharged. Accordingly, the controller 13 may be configured to monitor the charge amount of the first battery module 11, and when the charge amount of the first battery module 11 is discharged to be less than a predetermined level, the controller 13 may be configured to perform active cell balancing to transfer a part of energy stored in the second battery module 12 to the first battery module 11 to charge the battery cells 111 of the first battery module 11, thereby preventing overdischarge of the first battery module 11.

Further, referring to FIG. 3, when the key of the vehicle is in the ACC (accessary) state, the IG (ignition) ON/OFF state, and the ST (start) state, the first switch 14 may be turned off such that the LDC 17 is not operated. Accordingly, the vehicle may receive a power supply voltage from the second battery module 12 and operate the low-voltage load 19 including a hot wire, a radio, a black box, and external mounting components. The second battery module 12 may be discharged due to the consumption current of the low-voltage load 19.

Accordingly, the controller 13 may be configured to monitor the charge amount of the second battery module 12, and when the charge amount of the second battery module 12 is discharged to be less than a predetermined level, the controller 13 may be configured to perform active cell balancing, to transfer a part of energy stored in the first battery module 11 to the second battery module 12 to charge the battery cells 121 of the second battery module 12, thereby preventing overdischarge of the second battery module 12. In particular, the controller 13 may be configured to perform active cell balancing such that the charge amounts stored in the first and second battery modules 11 and 12 remain equal to or greater than desired levels thereof without decreasing to be equal to or less than predetermined levels thereof.

Figure 4:
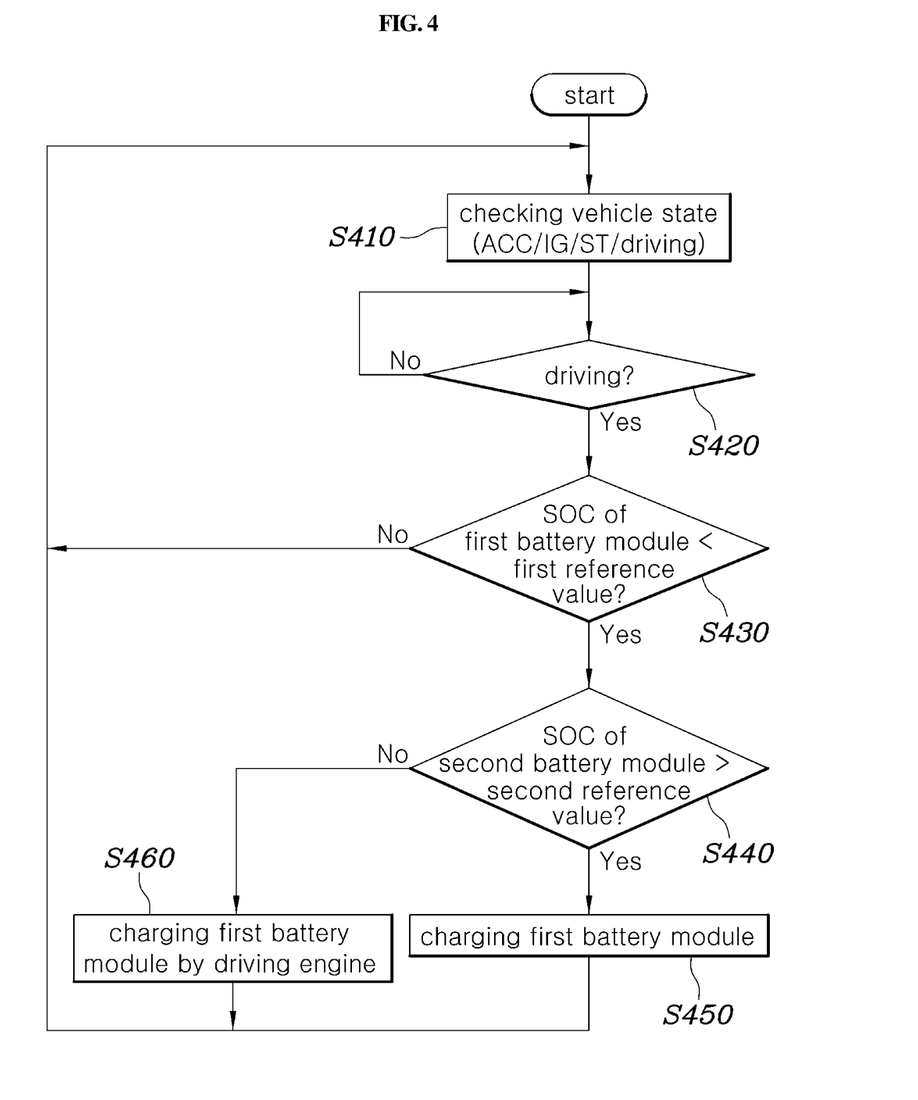
FIGS. 4 and 5 are flowcharts showing a method of controlling charge of a battery in the system according to an exemplary embodiment of the present invention.
Figure 5:
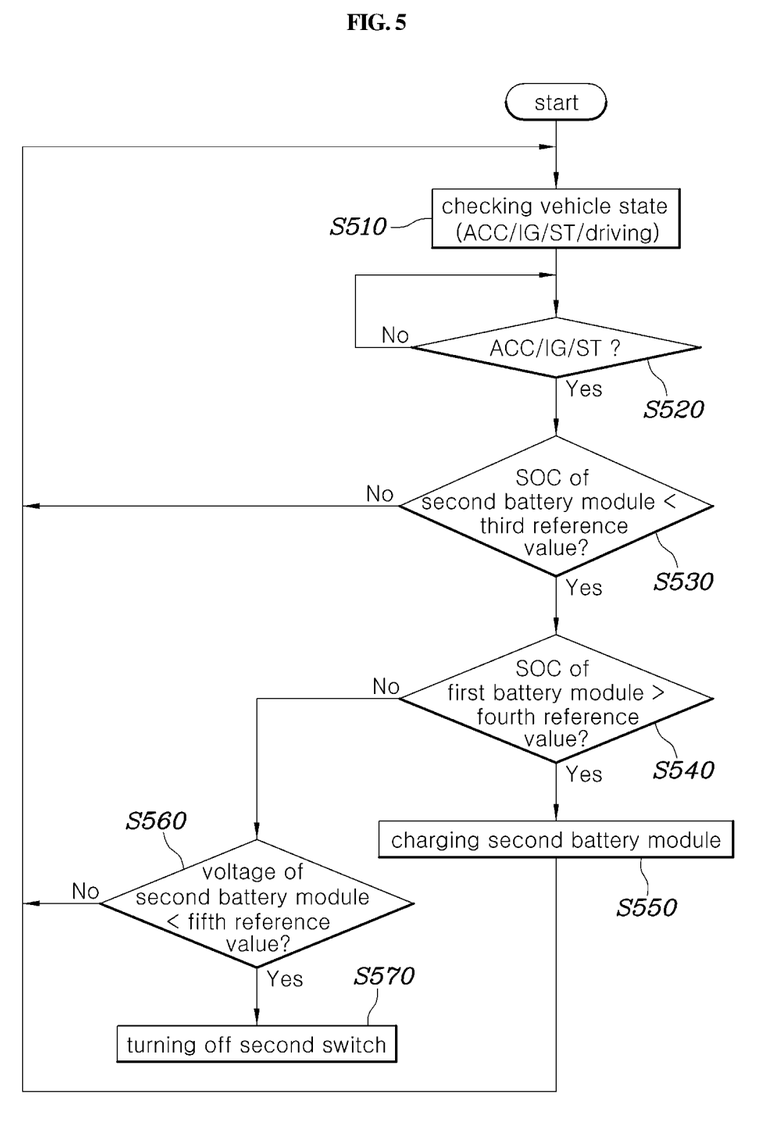

Moreover, FIGS. 4 and 5 are flowcharts showing a method of controlling charge of a vehicle battery according to an exemplary embodiment of the present invention. In particular, FIG. 4 shows an active cell balancing process of a high-voltage battery, and FIG. 5 shows an active cell balancing process of a low-voltage battery. Referring to FIGS. 4 and 5, when a state of charge of one of the first and second battery modules 11 and 12 is less than a predetermined level, the controller 13 may be configured to perform active cell balancing between the battery cells 111 of the first battery module 11 and the battery cells 121 of the second battery module 12.

First, referring to FIG. 4, the controller 13 may be configured to receive a vehicle operation state signal from outside (S410) (e.g., from a sensor). In particular, the vehicle operation state signal refers to an operation state signal of any one of ACC, IG, ST, and driving state signals. When the controller 13 receives a vehicle driving signal (S420), the controller 13 may be configured to compare the charge amount stored in the first battery module 11 with a first reference value (S430). When a signal other than the vehicle driving signal is received, the controller 13 may be configured to detect the state of the vehicle again. When the charge amount of the first battery module 11 is less than the first reference value, the controller 13 may be configured to compare the charge amount stored in the second battery module 12 with a second reference value (S440). When the charge amount of the first battery module 11 is equal to or greater than the first reference value, the controller 13 may be configured to determine that a sufficient amount of energy stored in the first battery module 11 remains after being supplied to the high-voltage load 18 of the vehicle, and thus prevents further charge of the first battery module 11.

Additionally, when a predetermined time has elapsed, the controller 13 may be configured to detect the state of the vehicle again. When the charge amount of the second battery module 12 is greater than the second reference value, the controller 13 may be configured to perform active cell balancing such that energy stored in the second battery module 12 is moved to the first battery module 11 to charge the first battery module 11 (S450). Thereafter, when a predetermined time has elapsed, the controller 13 may be configured to detect the state of the vehicle again and repeat the above process.

On the contrary, when the charge amount of the second battery module 12 is equal to or less than the second reference value, the controller 13 may be configured to charge the first battery module 11 with external power (S460). For example, when the vehicle in which the battery system is used is a hybrid vehicle using the driving force of each of an engine and a motor, the external power may be electric energy obtained by converting the rotational force of the engine using an alternator. Thereafter, when a predetermined time has elapsed, the controller 13 may be configured to detect the state of the vehicle again and repeat the above process.

Furthermore, referring to FIG. 5, the controller 13 may be configured to receive the vehicle operation state signal from outside (S510). In particular, when at least any one of vehicle non-driving signals, that is, ACC, IG, and ST state signals, is received by the controller 13 (S520), the controller 13 may be configured to compare the charge amount stored in the second battery module 12 with a third reference value (S530). When a signal other than the vehicle non-driving signals is received, the controller 13 may be configured to detect the state of the vehicle again. When the charge amount of the second battery module 12 is less than the third reference value, the controller 13 may be configured to compare the charge amount stored in the first battery module 11 with a fourth reference value (S540).

When the charge amount of the second battery module 12 is equal to or greater than the third reference value, the controller 13 may be configured to determine that a sufficient amount of energy stored in the second battery module 1 remains after being supplied to the low-voltage load 19 of the vehicle, and thus prevents a further charge of the second battery module 12. When a predetermined time has elapsed, the controller 13 may be configured to detect the state of the vehicle again. When the charge amount of the first battery module 11 is greater than the fourth reference value, the controller 13 may be configured to perform active cell balancing to transfer the energy stored in the first battery module 11 to the second battery module 12 to charge the second battery module 12 (S550). Thereafter, when a predetermined time has elapsed, the controller 13 may be configured to detect the state of the vehicle again and repeat the above process.

On the contrary, when the charge amount of the first battery module 11 is equal to or less than the fourth reference value, the controller 13 may be configured to compare a voltage of the second battery module 12 with a fifth reference value (S560). When the voltage of the second battery module 12 is less than the fifth reference value, the second switch 15 may be turned off to prevent further discharge of the second battery module 12, such that electrical connection between the second battery module 12 and the low-voltage load 19 is in an open state (S570).

As described above, according to the exemplary embodiment of the present invention, it may be possible to efficiently increase an available battery capacity without requiring installation of an additional battery, and thus battery life extension can be achieved. Further, it may be possible to reduce the cost and to more efficiently improve the specification of the vehicle without additionally installing a high-priced, a high-volume, and a heavy-weight battery.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vehicle battery system, comprising:
a first battery module having a plurality of battery cells connected to each other in series;
a second battery module having a plurality of battery cells connected to each other in series, the second battery module being connected to the first battery module in series; and
a controller configured to monitor a state of charge of each of the first and second battery modules, and when the state of charge of one of the first and second battery modules is less than a predetermined level, the controller is configured to perform active cell balancing between the battery cells of the first battery module and the battery cells of the second battery module,
wherein an output voltage of the second battery module corresponds to a power supply voltage for a low-voltage load of a vehicle, and
wherein the controller is configured to perform the active cell balancing such that the second battery module is charged with energy stored in the first battery module when the vehicle is in a non-driving state, a charge amount of the second battery module is less than a third reference value, and a charge amount of the first battery module is greater than a fourth reference value.

2. The system of claim 1, wherein a voltage obtained by summing an output voltage of the first battery module and an output voltage of the second battery module corresponds to a power supply voltage for a high-voltage load of a vehicle.

3. The system of claim 2, wherein the controller is configured to perform the active cell balancing such that the first battery module is charged with energy stored in the second battery module when the vehicle is in a driving state, a charge amount of the first battery module is less than a first reference value, and a charge amount of the second battery module is greater than a second reference value.

4. The system of claim 2, wherein the controller is configured to perform the active cell balancing such that the first battery module is charged with external power when the vehicle is in a driving state, a charge amount of the first battery module is less than a first reference value, and a charge amount of the second battery module is equal to or less than a second reference value.

5. The system of claim 1, further comprising:
a second switch connected between the second battery module and the low-voltage load,
wherein the controller is configured to turn off the second switch when a charge amount of the second battery module is less than a third value and a charge amount of the first battery module is equal to or less than a fourth reference value.

6. A method of controlling charge of a vehicle battery, wherein the method is used in a vehicle battery system including first and second battery modules connected to each other in series, and a controller configured to monitor a state of charge of each of the first and second battery modules, the method comprising:

performing, by the controller, active cell balancing between battery cells of the first battery module and battery cells of the second battery module when the state of charge of one of the first and second battery modules is less than a predetermined level, wherein the performing of the active cell balancing further includes:

detecting, by the controller, an operation state of a vehicle;

comparing, by the controller, a charge amount of the second battery module with a third reference value when the vehicle is in a non-driving state:

comparing, by the controller, a charge amount of the first battery module with a fourth reference value when the charge amount of the second battery module is less than the third reference value; and charging, by the controller, the second battery module with energy stored in the first battery module by performing the active cell balancing when the charge amount of the first battery module is greater than the fourth reference value.

7. The method of claim 6, wherein the performing of the active cell balancing further includes:

detecting, by the controller, an operation state of a vehicle;

comparing, by the controller, a charge amount of the first battery module with a first reference value when the vehicle is in a driving state;

comparing, by the controller, a charge amount of the second battery module with a second reference value when the charge amount of the first battery module is less than the first reference value; and charging, by the controller, the first battery module with energy stored in the second battery module by performing the active cell balancing when the charge amount of the second battery module is greater than the second reference value.

8. The method of claim 7, further including:

charging, by the controller, the first battery module using external power when the charge amount of the second battery module is equal to or less than the second reference value.

9. The method of claim 6, wherein the system further includes a second switch connected between the second battery module and a low-voltage load, and the method further includes:

comparing, by the controller, a voltage of the second battery module with a fifth reference value when the charge amount of the first battery module is equal to or less than the fourth reference value; and turning off, by the controller, the second switch when the voltage of the second battery module is less than the fifth reference value.

* * * * *